(12) United States Patent
Kolawa et al.

(10) Patent No.: US 7,596,778 B2
(45) Date of Patent: Sep. 29, 2009

(54) METHOD AND SYSTEM FOR AUTOMATIC ERROR PREVENTION FOR COMPUTER SOFTWARE

(75) Inventors: Adam K. Kolawa, Bradbury, CA (US); Wendell T. Hicken, La Verne, CA (US); Arthur R. Hicken, Upland, CA (US); Marek Kucharski, Krakow (PL); Gary Alan Brunnell, Lake Forest, CA (US)

(73) Assignee: Parasoft Corporation, Monrovia, CA (US)

( * ) Notice: Subject to any disclaimer, the term of this patent is extended or adjusted under 35 U.S.C. 154(b) by 540 days.

(21) Appl. No.: 10/613,166

(22) Filed: Jul. 3, 2003

(65) Prior Publication Data

US 2005/0015675 A1 Jan. 20, 2005

(51) Int. Cl.
  *G06F 9/44* (2006.01)
  *G06F 9/45* (2006.01)
  *G06F 11/00* (2006.01)

(52) U.S. Cl. .............. 717/126; 717/103; 717/125; 717/127; 717/131; 717/141; 714/38; 714/52

(58) Field of Classification Search ................ 717/124, 717/126, 129, 131
See application file for complete search history.

(56) References Cited

U.S. PATENT DOCUMENTS

| | | | |
|---|---|---|---|
| 5,371,883 A * | 12/1994 | Gross et al. .................... 714/38 |
| 5,754,860 A * | 5/1998 | McKeeman et al. ......... 717/124 |
| 5,930,798 A | 7/1999 | Lawler et al. |
| 6,002,869 A * | 12/1999 | Hinckley ...................... 717/124 |
| 6,219,829 B1 * | 4/2001 | Sivakumar et al. ........... 717/131 |
| 6,301,701 B1 * | 10/2001 | Walker et al. ................ 717/125 |
| 6,625,760 B1 * | 9/2003 | Man et al. ...................... 714/33 |
| 6,725,399 B1 * | 4/2004 | Bowman ....................... 714/38 |
| 6,804,796 B2 * | 10/2004 | Gustavsson et al. ........... 714/38 |
| 6,986,125 B2 * | 1/2006 | Apuzzo et al. ............... 717/124 |
| 7,275,184 B2 * | 9/2007 | Wolff et al. .................... 714/39 |
| 7,299,382 B2 * | 11/2007 | Jorapur ......................... 714/38 |
| 2002/0073403 A1 * | 6/2002 | Fleehart et al. .............. 717/131 |
| 2002/0162091 A1 * | 10/2002 | Crocker ....................... 717/126 |
| 2003/0204346 A1 * | 10/2003 | Kennedy et al. .............. 702/81 |
| 2003/0204784 A1 * | 10/2003 | Jorapur ......................... 714/38 |
| 2004/0143819 A1 * | 7/2004 | Cheng et al. ................. 717/125 |
| 2004/0153830 A1 * | 8/2004 | Cebula et al. .................. 714/38 |
| 2005/0102660 A1 * | 5/2005 | Chen et al. ................... 717/168 |

* cited by examiner

*Primary Examiner*—Tuan Q Dam
*Assistant Examiner*—Isaac T Tecklu
(74) *Attorney, Agent, or Firm*—Christie, Parker & Hale, LLP

(57) ABSTRACT

In one embodiment, the present invention is a method for automatically preventing errors in computer software. The method includes storing the computer software in a code repository; executing a plurality of software verification tools to verify the computer software, wherein each of the plurality of software verification tools automatically generates one or more test cases; generating verification results responsive to executing the plurality of software verification tools and the automatically generated test cases; processing the verification results for generating an objective criterion of quality of the computer software; and customizing the scope of one or more of the plurality of verification tools responsive to the objective criterion of quality of the computer software.

32 Claims, 11 Drawing Sheets

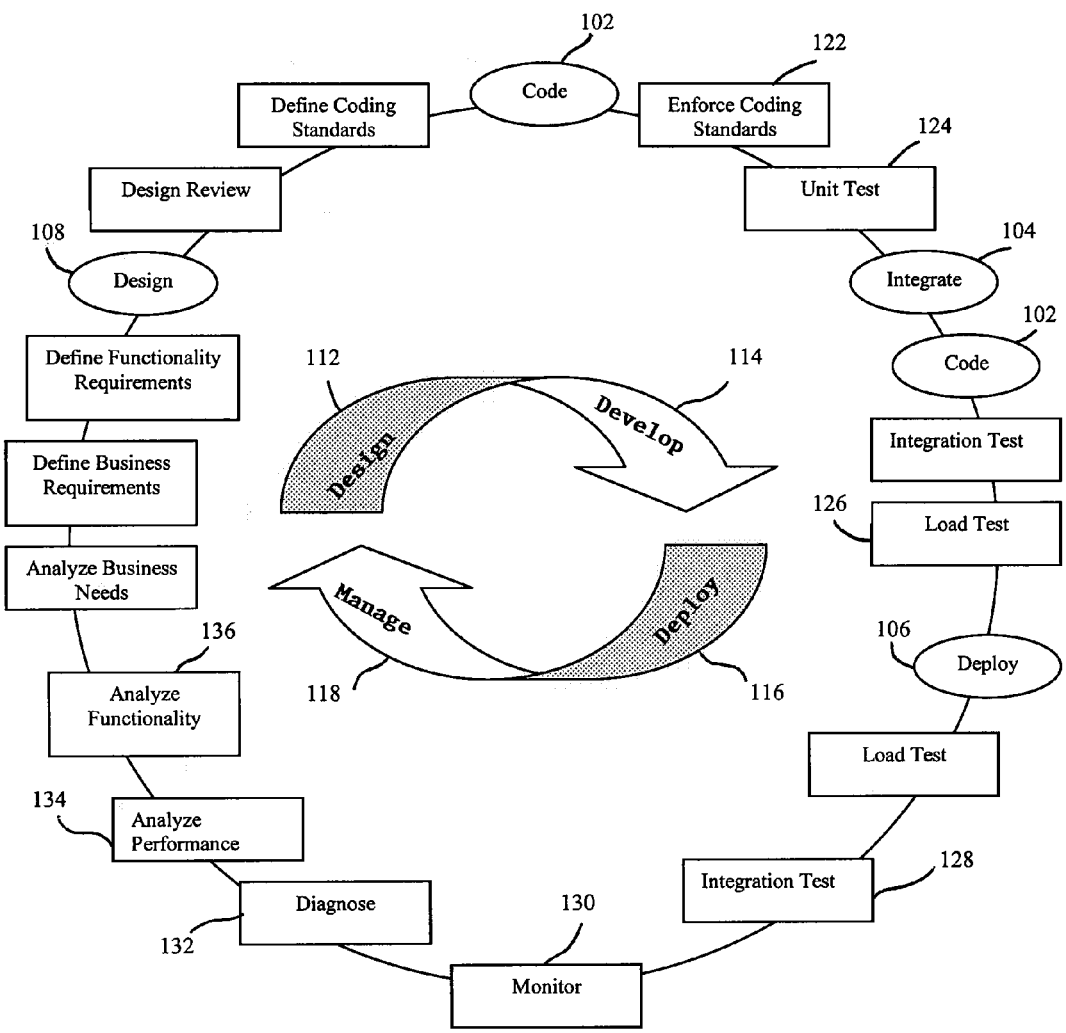
Fig. 1A
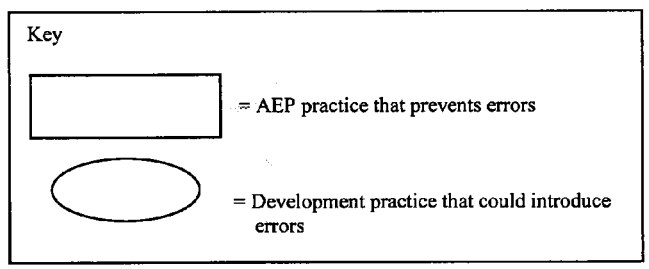

```
Command Prompt - PS_CheckIn test.java
C:\tests>PS_CheckIn test.java
----------------------------------------------------------------
Running Jtest PS_CheckIn
----------------------------------------------------------------

Jtest: Version 4.5.3 -- Copyright (C) 1997-2003 Parasoft Corporation
----------------------------------------------------------------
Running test: C:\tests\test.ctp Testing: test
    7 errors found.
----------------------------------------------------------------

Jtest Exited
----------------------------------------------------------------

Writing Results in C:\Program Files\ParaSoft\Jtest4.5\u\rung\HTML_Reports\2003-0
3-05\test.java_2003-03-05_01-17-PM.html
----------------------------------------------------------------

Results from Jtest CheckIn

Type of Violation          Threshold             Errors Found in Code
----------------------------------------------------------------
Severe Violation:          8                     3
Possible Severe Violation  10                    4
Violation                  NA                    NA
Possible Violation         NA                    NA
Informational              NA                    NA
----------------------------------------------------------------

Checking In Java

Microsoft Windows 2000 [Version 5.00.2195]
(C) Copyright 1985-2000 Microsoft Corp.

C:\tests>
```

| | Files changed | | | |
|---|---|---|---|---|
| | Week 18/03 | Week 19/03 | Week 20/03 | Total |
| jelonek | . | . | . | 1 |
| mewman | . | 1 | . | 1 |
| rozensu | . | 1 | . | 1 |
| mali | . | 3 | . | 3 |
| kosacki | . | 2 | 5 | 5 |
| rudster | . | 5 | 6 | 8 |
| ahidden | . | 8 | 4 | 9 |
| whicken | . | 8 | 1 | 9 |
| ufrog | . | 8 | 4 | 12 |
| pinkey | . | 6 | 7 | 13 |
| miek | . | 16 | . | 16 |
| tommasi | . | 16 | 1 | 17 |
| jaroszko | . | 7 | 11 | 18 |
| kubs | . | 10 | 12 | 22 |
| tomciu | 6 | 14 | 8 | 28 |
| maco | . | 33 | . | 33 |
| jucha | . | 25 | 12 | 37 |
| kerek | . | 12 | 25 | 37 |
| tomtom | . | 19 | 19 | 38 |
| thm | . | 13 | 32 | 45 |
| pietrek | . | 30 | 16 | 46 |
| mlyko | . | 27 | 30 | 57 |
| kenys | . | 47 | 11 | 58 |
| marzec | . | 29 | 32 | 61 |
| muzzy | . | 50 | 11 | 61 |
| macietg | . | 53 | 12 | 65 |
| loomis | . | 47 | 23 | 70 |
| januszst | . | 50 | 23 | 73 |
| konrad | 5 | 58 | 22 | 85 |
| cowartek | . | 96 | 13 | 109 |
| roberts | . | 85 | 28 | 113 |
| dario | . | 152 | 15 | 167 |
| grzesiek | 58 | 118 | 24 | 200 |
| lachu | . | 55 | 210 | 265 |
| TOTAL | 69 | 1096 | 618 | 1783 |

METHOD AND SYSTEM FOR AUTOMATIC ERROR PREVENTION FOR COMPUTER SOFTWARE

FIELD OF THE INVENTION

The present invention relates to a computer system and software. More specifically, the present invention is directed to a method and system for automatically preventing errors of computer software.

BACKGROUND OF THE INVENTION

The problem of writing error-free computer programs has plagued programmers since the beginning. Sophisticated schemes for automatically discovering program errors and bugs of all kinds, including lexical, syntactic, semantic and logical, have been developed. However, these schemes have generally been directed to enforcing adherence to concrete programming standards inherent in the definition of the programming language itself and not to more extrinsic quality-related concerns, such as language modularity, portability, testing costs and communications between different program modules in networked and distributed environments.

Most of software developers understand that the longer an error is allowed to remain in the software before it is discovered, the more expensive it becomes to fix. With vigilant testing from the earliest phases of the software lifecycle, software development teams find errors earlier and reduce the likelihood of discovering the error further down in the software lifecycle. Early detection reduces the cost of fixing each error, which in turn, reduces the cumulative cost of fixing the thousands of errors that typically surface in the course of a project. Considering the costs an organization would incur if even few errors were not found until late in the lifecycle, it is clear that early detection of errors yields a substantial cost benefit.

In addition to reducing development costs, error prevention can dramatically reduce maintenance costs, increase team efficiency, and facilitate the system/software changes that are required to stay competitive in today's market. By preventing errors, software development teams reduce the total quantity of errors that would increase the project costs further. When a team has an automated and comprehensive method for preventing errors throughout the lifecycle of the software product, the team typically prevents hundreds or even thousands of errors from occurring throughout a project. As a result, the team has significantly fewer errors to find and fix, which translates to reduced costs and a more rapid, efficient development process.

Error prevention not only reduces the total time and money required to find and fix defects, but also reduces the cost of change. Most applications need to change as the market and business requirements evolve. However, each change typically introduces errors, and the more errors that are in the code prior to a change, the more additional errors that change is likely to introduce. As a result, it is considerably more costly to change a project containing many errors than it is to change a similarly-sized project that is virtually error-free. Without error prevention, every change usually introduces a large number of errors that are costly to find and fix. However, if a team proactively prevents errors and detects errors as soon as they are introduced, each change is less costly and problematic; fewer errors need to be detected and fixed, and any new errors can be removed immediately, before they spawn additional errors. Because error prevention diminishes the need for debugging, traditionally the most costly and time-consuming part of the change process, increases linearly with the amount of code, rather than exponentially.

There are a variety of error prevention practices available to software developers, among them code reviews, coding standards, unit testing, regression testing, and load and functionality testing. Each of these practices is suited to automation. Software manufacturers committed to eradicating errors in their applications would need to create an Automated Error Prevention (AEP) system that addresses each of these practices as a separate stage within the software development lifecycle.

Therefore, there is a need for a system and method to automatically prevent errors during all stages of computer software lifecycle.

SUMMARY OF THE INVENTION

In one embodiment, the present invention is a method for automatically preventing errors in computer software. The method includes storing the computer software in a code repository; executing a plurality of software verification tools to verify the computer software, wherein each of the plurality of software verification tools automatically generates one or more test cases; generating verification results responsive to executing the plurality of software verification tools and the automatically generated test cases; processing the verification results for generating an objective criterion of quality of the computer software; and customizing the scope of one or more of the plurality of verification tools responsive to the objective criterion of quality of the computer software.

In one embodiment, the present invention is a system for automatically preventing errors in computer software. The system includes means for storing the computer software in a code repository; means for executing a plurality of software verification tools to verify the computer software, wherein each of the plurality of software verification tools automatically generates one or more test cases; means for generating verification results responsive to executing the plurality of software verification tools and the automatically generated test cases; means for processing the verification results for generating an objective criterion of quality of the computer software; and means for customizing the scope of one or more of the plurality of verification tools responsive to the objective criterion of quality of the computer software.

BRIEF DESCRIPTION OF THE DRAWINGS

FIG. 1A is an exemplary simplified flow diagram of a software product life cycle;

FIG. 2C shows exemplary results of a code check-in using a tool/check-in integration method, according to one embodiment of the present invention;

FIG. 4B is an exemplary GUI screen for an architect, according to one embodiment of the present invention.

DETAILED DESCRIPTION

Figure 1B:
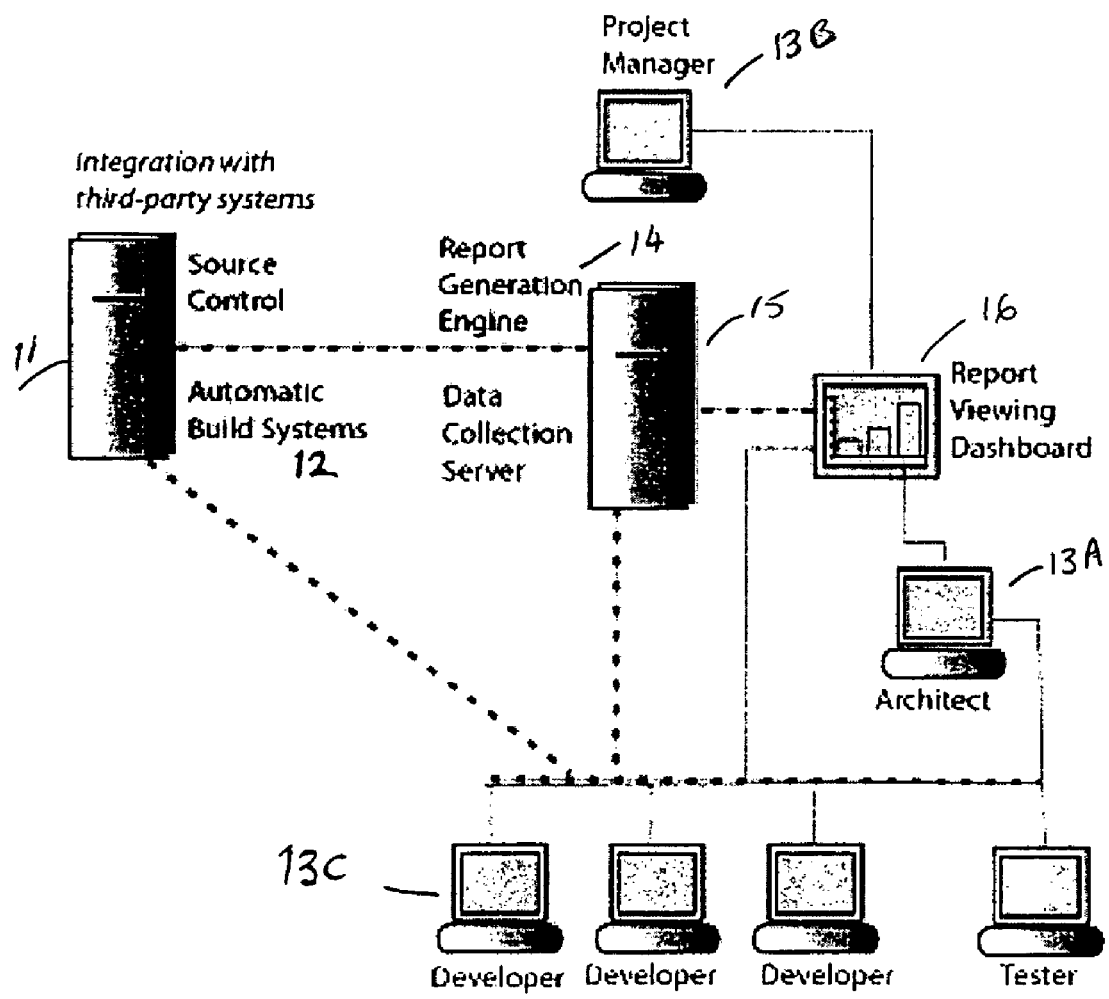
FIG. 1B is an exemplary simplified block diagram of an AEP system, according to one embodiment of the present invention.

In one embodiment, the present invention is a method and system for preventing errors throughout the full computer software lifecycle. Each custom turnkey AEP system and process combines technologies, practices, and training to help a software development organization. Some advantages of the method and system of the present invention include: improved product reliability, streamlined development process, reduced time to market/deployment, reduced cost of change, and reduced development and maintenance costs.

In one embodiment, an AEP process includes five key steps:
1. Detecting a defect.
2. Determining what production process practice permitted that defect.
3. Determining what modifications are required to make that practice less error-prone.
4. Modifying that practice so that it does not permit repeat occurrences of that defect and similar defects.
5. Implementing a metric that measures whether the desired process improvement was actually achieved (i.e., an objective measurement of the code quality).

The AEP system and method of the present invention use error detection as the catalyst for process improvement and error prevention. Each time a specific error is detected, the process is modified to prevent an entire class of errors. To ensure that this methodology becomes a long-lasting part of even the most rushed and chaotic software development processes, AEP includes technologies that automate as many software error prevention practices as possible, including historically difficult and time-consuming practices such as test case creation and verification of custom guidelines/requirements. AEP also provides an infrastructure that automatically manages processes of execution, management, and reporting.

The AEP process adds automated error prevention practices (such as different breeds of automated testing, automated standard enforcement, automated monitoring, and the like) to prevent and expose errors throughout the entire software lifecycle. FIG. 1A illustrates how the AEP processes fit into the four main phases of a software lifecycle, "Design" 112, "Develop" 114, "Deploy" 116, and "Manage" 118. As shown in FIG. 1A, the rectangular boxes indicate the AEP practices (verification tools) that prevent errors. Similarly, the oblique boxes indicate the development practices corresponding to each phase of the life cycle that could introduce errors, such as, "code" 102, "integrate" 104, "deploy" 106, and "design" 108. For example, the AEP practices (verification tools) for "Enforcing Coding standards" 122, and "Unit Test" 124 (using the corresponding verification tools) fit into and correspond to the "Develop" 114 phase of the lifecycle. Similarly, the verification tools for "Load Test" 126, and "Integration Test" 128 relate to the "Deploy" 116 phase of the lifecycle. Likewise, the verification tools for "Monitor" 130, "Diagnose" 132, "Analyze Performance" 134, and "Analyze Functionality" 136 correspond to the "Manage" 118 phase of the lifecycle. AEP practices and technologies expose different types of mistakes and errors at the earliest possible phase of the software lifecycle. This early detection prevents errors from multiplying (as a result of code re-use and new code being built upon problematic code) and significantly reduces the cost of correcting the errors. Moreover, each time a problem is exposed, the manager or team leader uses the AEP method and technologies to determine what development phase or practice permitted the problem, and to modify the process so that similar errors cannot be introduced. Finally, the manager or team leader implements measures that gauge how effectively the modification prevents errors as well as verify that the team is following the modified practice.

For example, assume that a team integrated several application parts and the results from AEP integration tests reveal that interactions are causing program crashes. Further analysis reveals that the problem occurs because Part B cannot handle the inputs that Part A is supposed to send. If the responsible developer fixes the code related to this specific problem, one error is eliminated, but nothing has been done to prevent the team from introducing similar errors. However, if the team leader also modifies the process to reduce the opportunity for this type of error, additional interaction problems will be prevented in this project and subsequent projects. For instance, the team leader could prevent similar interaction problems by requiring the team to immediately test every completed unit of code with a wide variety of possible inputs. The necessary repairs could then be implemented early in the process when errors are fastest, cheapest, and easiest to fix. This earlier diagnosis and repair would not only prevent crashes after integration, but also prevent the scores of additional errors that might otherwise stem from code reuse and from new code being built upon problematic code. The team leader could then track test coverage and resulting statistics to determine whether the entire team is following this practice.

All of this error detection, analysis, correlation, process modification, and measurement involves a lot of work. As a result, most software process improvement efforts are not implemented thoroughly and consistently, fail to yield the expected results, and fail to endure as a regular part of the software lifecycle.

However, to fully reap the potential of error prevention efforts, teams need to practice error prevention diligently throughout the software lifecycle. AEP makes this possible by providing an infrastructure that automatically executes the appropriate practices at the appropriate times. These practices are performed in the background; human intervention may only be required if the practices uncover a problem. This unique infrastructure includes technologies that automate complex aspects of software error prevention, from code inspection, to test case creation, to comprehensive post-deployment monitoring. Consequently, error prevention practices can be performed thoroughly and precisely, with minimal disruption to existing processes and projects.

In one embodiment, AEP is implemented in several steps:
1. Evaluation—the development procedures and processes is automatic.
2. Customization—the solution to fit the organization's development process is customized.
3. Automation—key error prevention practices are automatic and built into the existing development process, source control systems, and nightly build processes.

AEP implementation can begin at any stage of an organization's software lifecycle and extend through all subsequent phases and cycles. The organization begins implementing the AEP practices relevant to their current lifecycle phase (as shown in FIG. 1A), and then uses these practices to gauge whether the team and software should proceed to the next lifecycle phase. When the next lifecycle phase begins, the organization implements the AEP practices related to that lifecycle phase, and then repeats the process again. AEP peacefully co-exists with existing development process components such as change management, data management, design, testing, and so forth. In fact, AEP leverages, connects, and extends these components to boost software reliability and streamline the full software lifecycle. Moreover, AEP extends and promotes International Standard Organization (ISO) and Capability Maturity Model (CMM) efforts for process improvement. AEP's automation removes the main obstacle that typically impedes process improvement efforts such as CMM and ISO—if required practices are not automated, the process improvement effort usually decays and fails to deliver the desired result. AEP addresses and automates many of the specific "key process areas" recommended for CMM—especially those associated with high-level assessment.

An AEP system, properly constructed, essentially manages itself. The system measures how well the infrastructure is working and modifies the appropriate process steps (and related software tools) whenever and wherever needed. There are several practical steps that are typically implemented in order to automate an AEP infrastructure for a development group or organization.

Figure 1C:
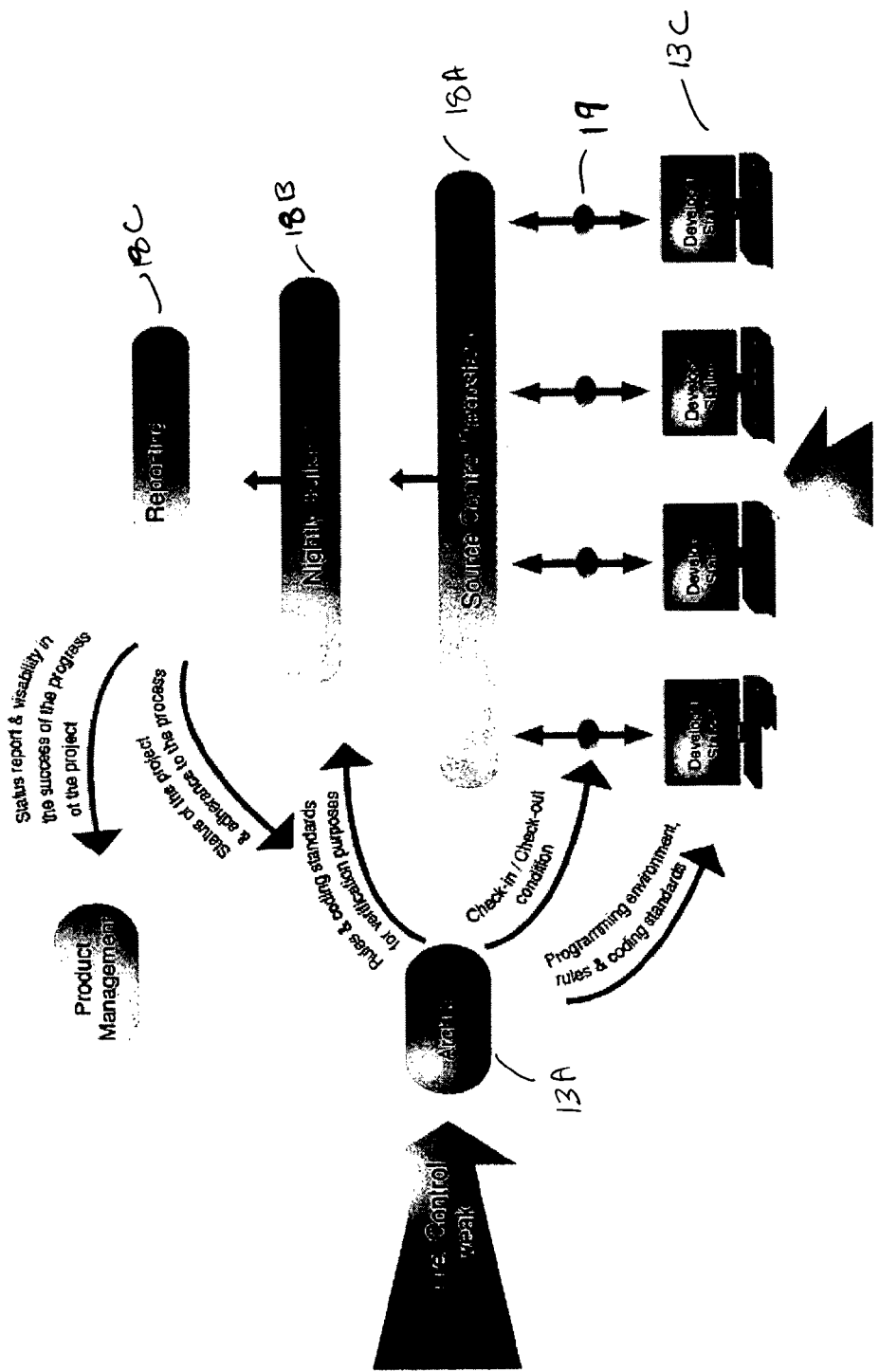
FIG. 1C is an exemplary simplified flow diagram of an AEP process, according to one embodiment of the present invention.

FIGS. 1B and 1C depict exemplary diagrams for an AEP system and process, according to one embodiment of the present invention. Common configuration files, source control 11 repositories, and nightly build practices using automatic build systems 12 are put in place in order to fully utilize error prevention practices and techniques. In most cases, the architect 13A or project manager 13B will have the responsibility of implementing an AEP infrastructure for a development group 13C or organization. The steps to performing this implementation include automating configuration files for automating the software development lifecycle in such a way that everyone on the team, from developers to project managers and architects, understands and uses AEP practices in the same way- Interaction with tools and practices need to be the same for each member of the team. This ensures consistent AEP practices and leaves no chance for operational differences to occur that allow errors to propagate.

The means for ensuring operational conformity include building a common directory structure, both within source control and within a common file directory, where configuration files for verification tools are kept and shared among developers or entire development teams. Sharing configuration files ensures that each member of a development team uses tools such as, Jtest™ or C++Test™ (from Parasoft Corp.) consistently and without damaging variances from the manner in which colleagues use the same tools. The AEP tools are capable of generating their own test cases, without any prior knowledge of the code. In other words, the AEP tools apply a rule-base system to the code without any human intervention for generating test cases. Some exemplary tools are described below, however, a complete description of more exemplary AEP tools can be found at "www.parasoft.com" website, the entire contents of which, as of the filing date of this application, is hereby expressly incorporated by reference.

For example, Parasoft Jtest™ is a complete Java developer's quality suite for code analysis, code review, automated unit and component testing, coverage analysis, and regression testing—on the desktop under leading IDEs and in batch processes. Jtest™ provides software development teams with a practical way to ensure that their Java code works as expected. Jtest™ tool allows creation of custom rules by modifying parameters, using a graphical design tool, or providing code that demonstrates a sample rule violation.

Moreover, Parasoft C++test™ is an integrated solution for automating a broad range of best practices proven to improve software development team productivity and software quality. C++test enables coding policy enforcement, static analysis, comprehensive code review, and unit and component testing to provide teams a practical way to ensure that their C and C++ code works as expected. C++test can be used both on the desktop under leading IDEs as well as in batch processes via command line interface for regression testing. C++test integrates with Parasoft's GRS reporting system, which provides interactive Web-based dashboards with drill-down capability, allowing teams to track project status and trends based on C++test results and other key process metrics. For embedded and cross-platform development, C++test can be used in both host-based and target-based code analysis and test flows. An advanced interprocedural static analysis module of C++test, simulates feasible application execution paths—which may cross multiple functions and files—and determines whether these paths could trigger specific categories of runtime bugs. Defects detected include using uninitialized or invalid memory, null pointer dereferencing, array and buffer overflows, division by zero, memory and resource leaks, and various flavors of dead code. The ability to expose bugs without executing code is especially valuable for embedded code, where detailed runtime analysis for such errors is often not effective or possible. Parasoft C++test™ tool includes a graphical RuleWizard editor for creating custom coding rules and provides automated code review with a graphical user interface and progress tracking.

Additionally, Parasoft®.TEST™ is an integrated solution for automating a broad range of best practices proven to increase software development team productivity and software quality. Parasoft.TEST™ ensures developers that their . NET code works as expected by enabling coding policy enforcement, static analysis, and unit testing. Parasoft. TEST™ also saves development teams time by providing a streamlined manual code review process. Parasoft .TEST can be used both on the desktop as a Microsoft Visual Studio™ plugin and in batch processes via command line interface for regression testing. Parasoft®.TEST™ includes a graphical RuleWizard editor (user interface) for creating custom coding rules Therefore, each of the verification tools is an independent tool with its own user interface, which can be executed in a batch process.

Next step is automating code check-in procedures. Once uniform operating practices are configured for an entire development group, AEP practices at the individual developer level are automated. This typically involves automation of check-in parameters 17 for source control repositories 18A. One effective means of doing this entails integrating a testing tool, such as CodeWizard™ or Jtest™ (from Parasoft Corp.), with the check-in procedures so that the tool automatically checks code constructs whenever developers attempt to place their work into the source code repository.

Automating a verification loop step in implementing an AEP infrastructure provides the means for determining whether all necessary automated practices are in place and how well they are working. The primary activity for automating a verification loop is putting automated nightly builds 18B into place. These builds use clean code that have successfully passed all other AEP checks and made it into the source code repository. Problems discovered at this stage usually indicate the need for additional AEP practices somewhere in the software development lifecycle. Setting nightly builds in place requires determining the best method for performing nightly builds. The choices include either performing testing and building together in batch mode for each class or compiled project, or performing testing and building in parallel on separate machines.

Another step is automating reports 18C. Implementing a feedback loop across the software development lifecycle, from design to deployment, is necessary if errors are to be prevented at every stage. This means understanding where the process is working and where it needs to be fine-tuned. As shown in FIG. 1B, Global Reporting System (GRS) 14 is an automated reporting structure that provides the data necessary to measure and evaluate how well all AEP practices are working and disseminates that information to the proper management personnel. When this infrastructure is in place, up to the point of integrating GRS into the system, AEP practices are available throughout the software development lifecycle. When GRS is added, useful and usable data can be gathered from each point in the software lifecycle (for example, in the data collection server 15 of FIG. 1B) and distributed through reports to the roles and individuals to keep the development process running at its peak efficiency. The reports may be view by individuals with different roles in a customized graphical user interface (Report Viewing Dashboard 16).

The above steps are discussed in further detail in the following sections. Automating configuration files in configuring the AEP infrastructure ensures the consistency of use of the infrastructure by the users, both management and development alike. One way to ensure consistent use is to devise a single configuration file or set of files within the source control system for the testing tools used by the development group. This ensures that the common testing tools used across the group, such as Jtest™ or C++ TeSt™, are all used in a standardized way by each developer. The architect has the right to modify configuration files for the development group or organization. Having a single resource (e.g., the architect) set up the configuration file or files and putting them into source control ensures that each member of the development team shares and works from the same configuration information, and that no unauthorized changes are made to the configuration file or files. When the entire group shares the same configuration files, testing is performed uniformly. This prevents "dirty" code from slipping through unauthorized testing practices and getting into the source control repository, where it can corrupt the project or application files.

Figure 2A:
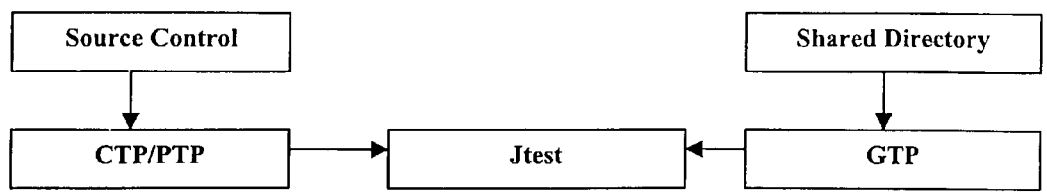
FIG. 2A is an exemplary depiction of three configuration files, according to one embodiment of the present invention.

For example, a Java development group working on a new application may use Jtest™ throughout the group to perform testing and verification tasks. The architect overseeing this group needs to provide three different configuration files: Class Test Parameters (CTP), Project Test Parameters (PTP), and Global Test Parameters (GTP). The first two files, the CTP and PTP configuration files, are stored in source control, while the GTP file is stored in a shared directory accessible by the development team, as shown in FIG. 2A. Jtest™ is a Java unit testing and static analysis tool that automatically tests any Java class, JSP, or component without requiring the developers to write a single test case, harness, or stub. Jtest™ automatically tests code construction (white-box testing), tests code functionality (black-box testing), and maintains code integrity (regression testing). User-defined test cases and stubs can be added if needed. Jtest™ also helps prevent errors with a customizable static analysis feature that lets the developer automatically enforce a large number of industry-respected coding standards, create and enforce any number of custom coding standards, and tailor the standards enforced to a particular project or group. By integrating Jtest™ into the software development process, software errors are prevented, code stability is increased, and testing time is reduced.

Once the parameter files are in place, Jtest™ is configured identically no matter which developer is using the tool, or which platform they may be working on (Linux, Windows, Unix, and so on). All tests performed through Jtest™ operate and behave in the same manner, reducing the chance of developer error or oversight. Should additional testing parameters become necessary, it is a simple matter for the architect to change the configuration files and make them available again to the team through source control or other common directories.

Once there is a consistent configuration of testing and development tools across the group, usage enforcement of those tools can be addressed. This is done through automating the code check-in procedure for the group.

Automating the code check-in procedure can be done in one of two ways:
1. Through a "Gentleman's Agreement." This is where developers police themselves with regards to check-in procedures. They "agree" to run a test on their code, using the common configuration files set up by the architect, before checking their code in. This agreement stipulates that any error or errors found need to be cleaned up before the code is placed into the source code repository.
2. Alternatively, the testing tools (Jtest™, for example) and are integrated with the check-in procedures for source control. In this method, whenever a developer checks-in code, the tool is automatically run so that the code in question is thoroughly examined. Problems found by the tool are fed back to the development stage and the check-in process is disallowed until the code completely passes the tests run by the tool. The main benefit of this method is that only clean code can be checked into source control.

Figure 2B:
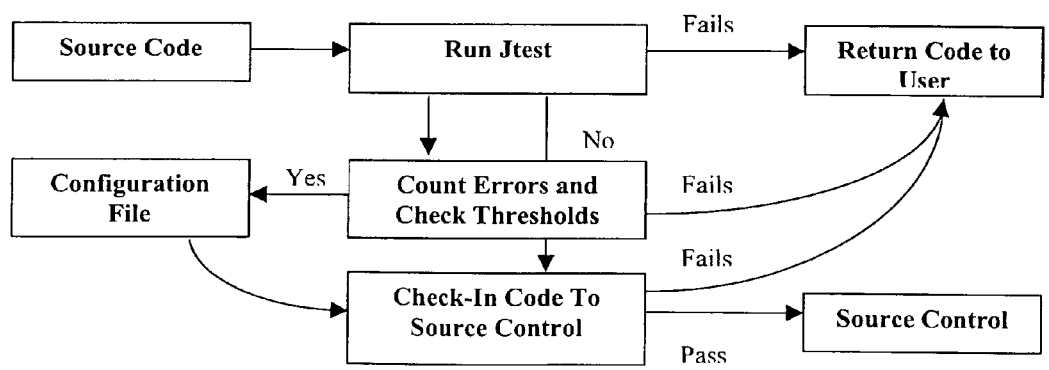
FIG. 2B is an exemplary depiction a tool running with or without check-in thresholds pre-configured through the configuration files, according to one embodiment of the present invention.

As shown in FIG. 2B, the tool can be run (for example, "Run Jtest" with or without check-in thresholds pre-configured by the architect trough the configuration files. Check-in thresholds stipulate that code can have only a certain number of coding errors, at a certain violation level, before it is rejected. To have a clean code, threshold levels need to be set to zero Note that the gentleman's agreement is implied in the path from source code to source control. However, only by putting into place the tool/source control integration only good, clean code gets into the source code repository.

FIG. 2C shows the results of a code check-in using the tool/check-in integration method described above. In this instance, Jtest™ was used to examine code constructs on the file test.ctp. As indicated, this test was run with a threshold of 8 or more severe violations would prevent code check-in, while 10 or more possible severe violations would feed the code back to the development stage. Only 3 and 4 errors of these types were discovered respectively. According to the limits set by these thresholds, the code, although it contains several errors, is considered clean enough for check-in (at least by the standards set by this development team's architect). Thresholds set to zero prevent errors of any type from entering source control, and are the most effective means for keeping bad code out of repositories used to build applications.

Automating code verification through nightly builds step uses nightly builds to automate a code verification loop, where code in source control, which has been shown to be clean though the automation of the first two steps, is used to build the complete software application and test it. Automatic build, in this context means the ability to trigger the action with a single command, but more than just build-users are able to automatically check out a new copy of the current version of the source code from the source control repository, build and compile it. During this step, static analysis are performed in batch mode to verify that all the coding standards are enforced during compilation process, either before or after compilation. The process should work in such a way that the users do not see any violations from the automatic build that could have been found at the desktop. A lot of people expect the inverse-that during nightly builds an organization could gather all the rule violations and distribute them to developers to fix, without first checking at the desktop level. However, this doesn't work efficiently because, it produces too many rule violations, and everyone becomes overwhelmed with the amount of work that needs to be done.

During nightly builds, zero violations are expected, and if any violation occurs, it should be addressed with a code review. Through the code review, there may be an engagement between the architect and the developer to discuss why this rule was violated, and why the developer believes there is reason to do so. This process fosters verification of code and involvement during code review, with the goal of making code review more productive, cost-effective and useful.

Typically, the entire application, once built, should not introduce or discover new errors that were not weeded out in the first two steps. There are multiple steps to automating a code verification loop using nightly builds. In the first step, the code is copied, or shadowed, from source control and is placed in a different location—for example, on another server or in a separate directory—so that the only copy of the code is not inadvertently lost or destroyed during the build. The second step is to access the configuration files that the team uses for the tool that will be used during the build, for example the GTP/PTP/CTP configuration files for Jtest™ or the .psrc file for C++Test™. This ensures that the nightly build will conduct the same series of tests or types of tests that were used on the code when it was initially checked, either by a developer when it was first written or when the code was checked into source control.

The verification tools in the AEP process are automated. That is the tools automatically generate test cases. The tools apply a rule-based scheme to the application code without the need for the tools to have any prior knowledge of the code. In other words, there is no need for the developers to manually generate test cases to verify the application code.

In one embodiment, the build process has two primary options. The application code can be built in batch mode using one machine or using multiple machines. The first of these methods, while slower, allows the users to weave the testing tool, C++Test™ or Jtest™, for example, into the build process and send data to GRS for each class or project compiled and built. This method simply requires that the user includes tool-specific compilation options into the makefile during the build process. This is an effective method for conducting tests, as it helps the users to reduce the unit of code being examined and prevents the users from missing errors that are easily overlooked in larger applications.

Running the build and the tests on separate machines is faster, and allows the user to examine the code while the entire application is being built. This option is ideal for very large projects, where time may be saved by separating these processes, or for simultaneously building release versions of an application while testing a debug configuration (for example, when the user needs to solve a customer service issue that stems from that same build). All data collected from the test machine is sent to GRS where it can be examined by the development team for future updates and upgrades of their application.

Figure 2D:
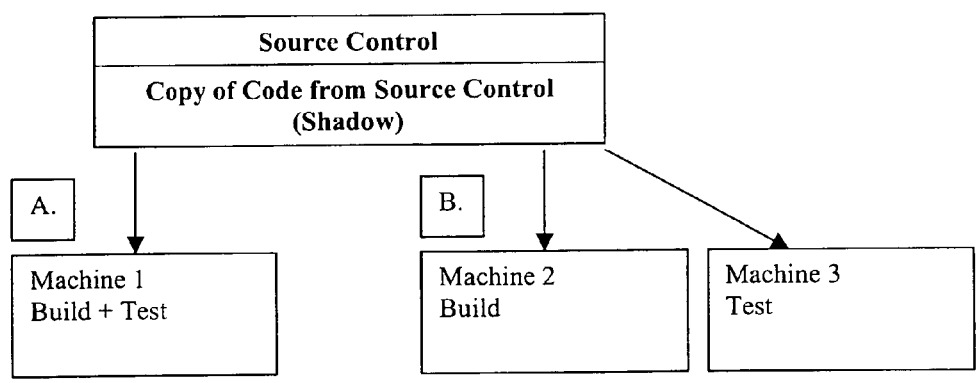
FIG. 2D shows exemplary options for a nightly build process, according to one embodiment of the present invention.

FIG. 2D shows each of these nightly build options. The first option is shown on the left (A.), where the build and the test are both conducted on Machine 1. The testing tool being used is defined as an executable in the makefile and is run at either the class level or project level during the build. Option B shows the build and test conducted on separate machines regardless of the approach, it is essential that the nightly builds use copies of code from source control and that the testing tool used during the build process uses the same configuration files used by the development team during previous tests and code check-ins. This ensures uniformity across the entire software development lifecycle, from the first code design to partial integration tests to final deployment. Following these steps ensures that the AEP infrastructure is properly configured. All that remains is to monitor the software development lifecycle for any fine-tuning that may need to be done. Users may also need to fine-tune the reports that come preconfigured in the GRS reporting tool.

Figure 3A:
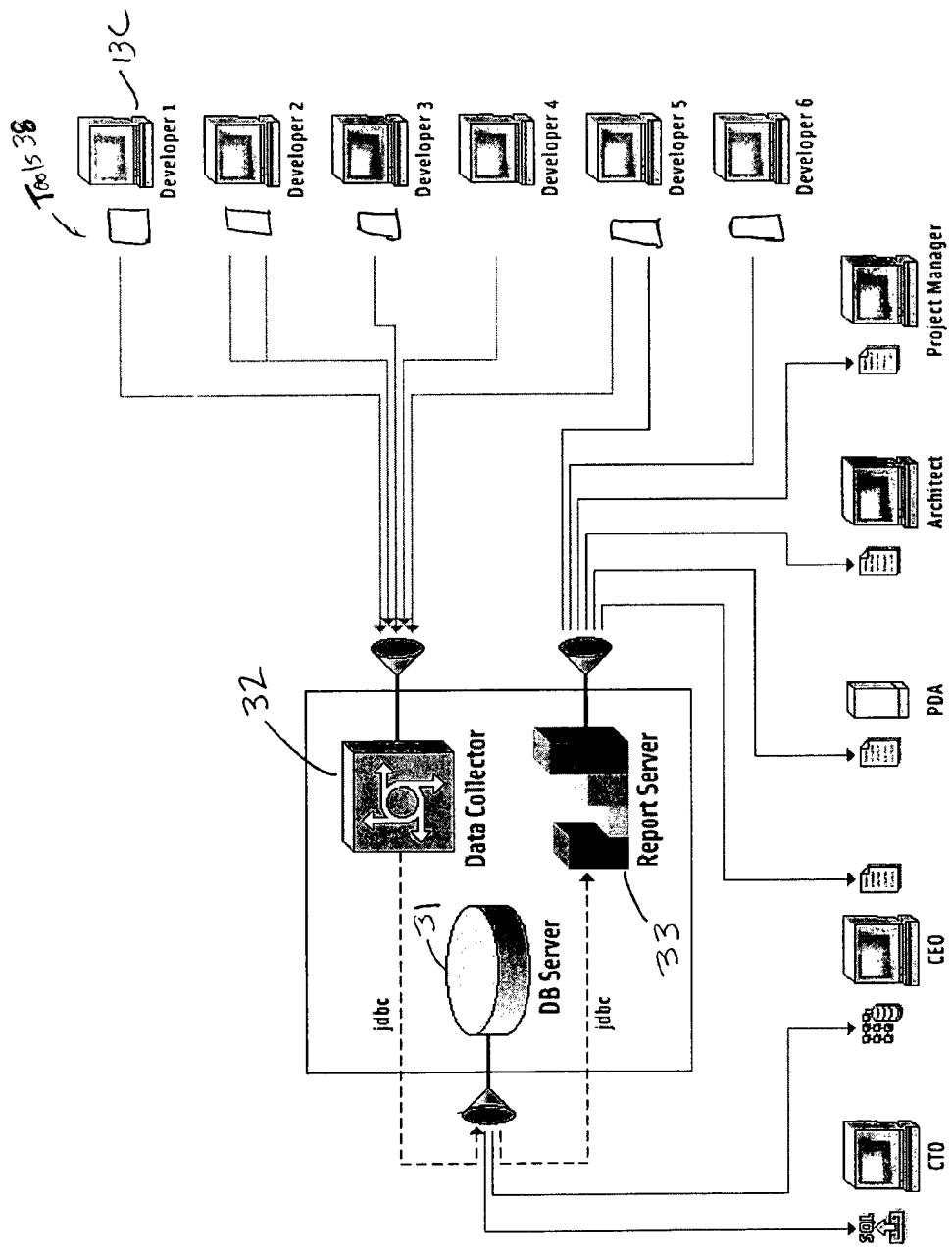
FIG. 3A is an exemplary block diagram of a reporting system, according to one embodiment of the present invention.

FIG. 3A illustrates a block diagram of a global reporting system (GRS). GRS is a support infrastructure that collects and correlates all information needed to support the implementation of an AEP infrastructure. GRS includes several functional parts:

A relational database 31 that stores information from runs of different testing tools. All collected information is stored in the database and used for statistical analysis and historical system behavior.

A data collector 32 that receives data from all Parasoft tools. Third party tools can easily be adopted to send data to the collector as well.

A reporting engine (server) 33 that uses a web-based interface to offer the user a variety of out-of-the-box statistical reports for data collected from Parasoft tools. In addition, the engine can gather information from other sources, such as a bug tracking system, and correlate all collected data into a single unit. Prepackaged reports can be customized to emulate individual systems within the software development lifecycle.

Data from testing and monitoring tools 38 (for example, Jtest™, C++Test™, WebKing™, SOAPtest™, CodeWizard™, DataRecon™, SOAPbox™, and WebBox™, from Parasoft® Corp.) is retrieved by the data collector 32 and stored in the relational database 31. Access to the database is through a set of standard reports targeted for the various roles (e.g., architect, project manager, developer, and so on) within the different AEP solutions that GRS supports (Java Solutions, Web Development Solutions, and so on). Each of the above-mentioned verification tools has one or more scope parameters in a configuration file shared by the software developers. Also, these verification tool are capable of automatically generating one or more test cases. This provides the capability of executing these verification tools by any of the developers on the entire code without having to manually generate any test cases. One or more scope parameters in the shared configuration file can be changed based on the determined objective criterion of the quality of the computer software. In other words, the verification scope of one or more of the verification tools can be customized based on the verification results from execution of the verification tools on the entire code. This provides a feedback loop that improves the quality of the verified code.

Access to GRS reports requires authorization with a login and password. Each GRS user account has a set of roles assigned to it. Once inside the system, the users are presented with a configurable dashboard that lets them visualize the status of their software development lifecycle. For example, a user with an appropriate access right can choose to view the behavior of the entire project, a development group, individual testers or programmers.

The flexibility of the GRS tool is achieved by customizing prepackaged reports to a given role, which allows the user to view different aspects of their development process, or by tagging their data with various attributes that are used as filters when analyzing development and test results.

Attributes are used to drill down through the data using standard reports. If further customization is needed, a reports administrator can assign new attributes to a name, either a fixed or variable value, depending upon the types of reports needed for analysis, resulting in total customization of the scope of reports available. The administrator interface is shown in the graphic below.

Figure 4A:
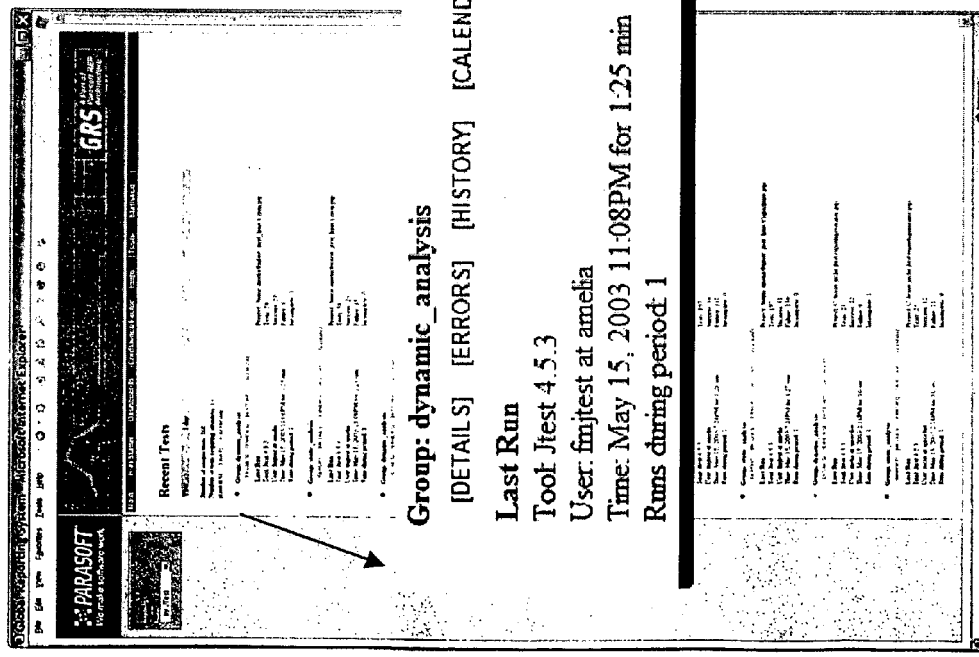
FIG. 4A is an exemplary GUI screen for a developer, according to one embodiment of the present invention.
Figure 4C:
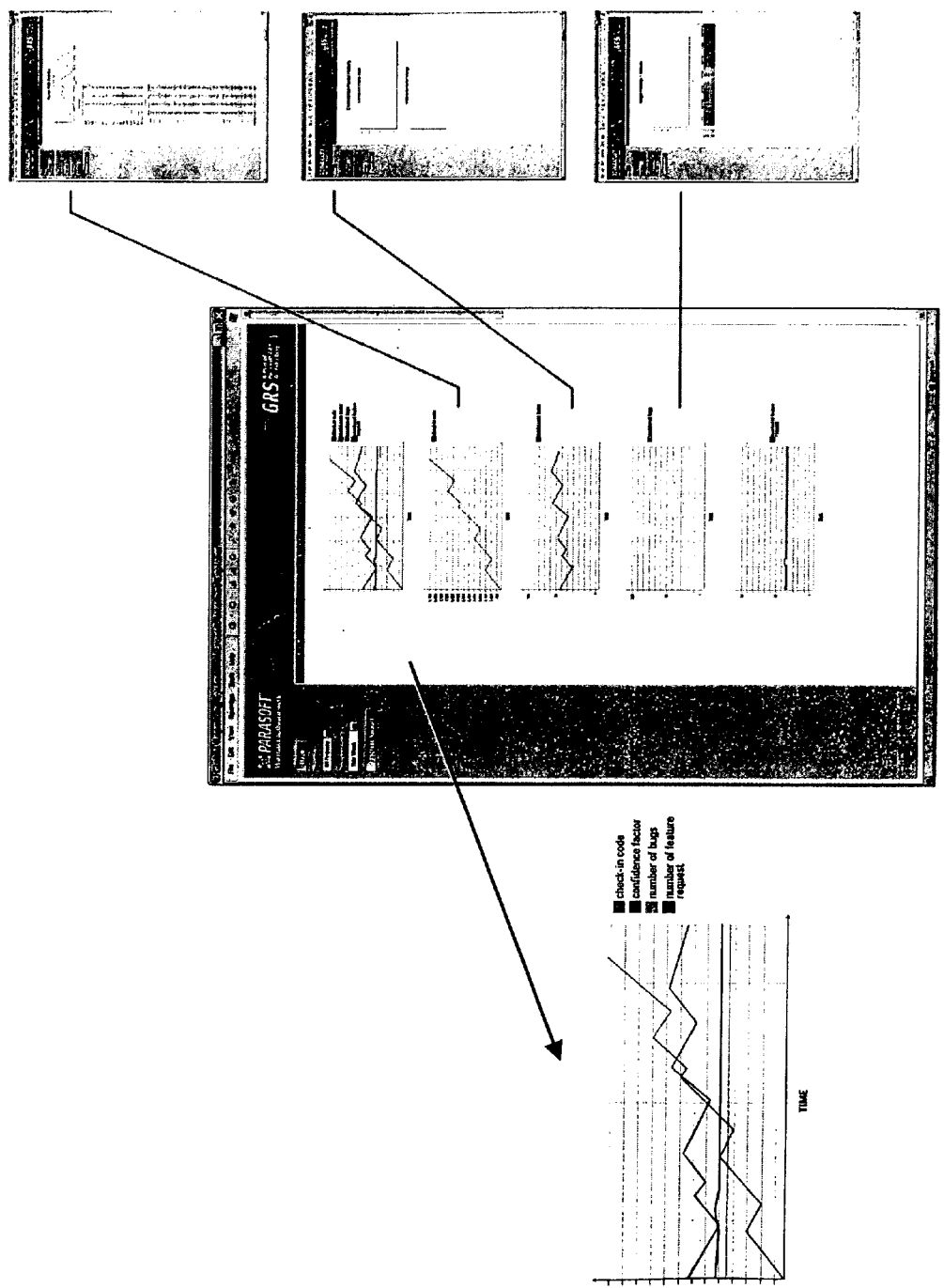
FIG. 4C is an exemplary GUI screen for a project manager, according to one embodiment of the present invention.

GRS allows slicing through test data in a variety of different ways, maximizing the understanding of how well the application is progressing towards release, what tasks remain, and any problems that have arisen during testing. When a standard report is accessed, it is shown in graphic form, as shown in FIGS. 4A to 4C. The user can click on this graphic to retrieve the data in an easy to read text format. Standard reports also include multiple data sets collected from different runs of tools. In one embodiment, GRS includes a relational database that stores data from various software tools and third party interfaces, a data collector that retrieves data from software tools and third party interfaces, predefined views, roles, and reports, customizable views and reports, and configurable graphical user interfaces (GUI) for each role. A plurality of interactive graphics indicate objective criteria for the quality of the code.

For example, for coding standards analysis, verification results or reports show adherence to coding rules and which rules were broken; for unit testing, reports show which test cases were run and provide information on test coverage; for bug tracking systems, reports can indicate the pace of bugs fixing, whether bugs are increasing or decreasing, and what software components are most responsible for bugs; and for monitoring systems, reports indicate how the monitoring system behaved during a given time period.

In one embodiment, GRS includes two levels of reporting that can be configured by the user. In the first level, the system can be configured to create reports from any activity at the developer desktop. For example, the architect and the developer can be automatically notified that there is a violation that needs to be addressed. This provides an instant report of errors and violations, but no analysis of improvement, relation to other developers, or relation to other projects. This level can provide a snapshot of the activity just completed by the developer.

Figure 3B:
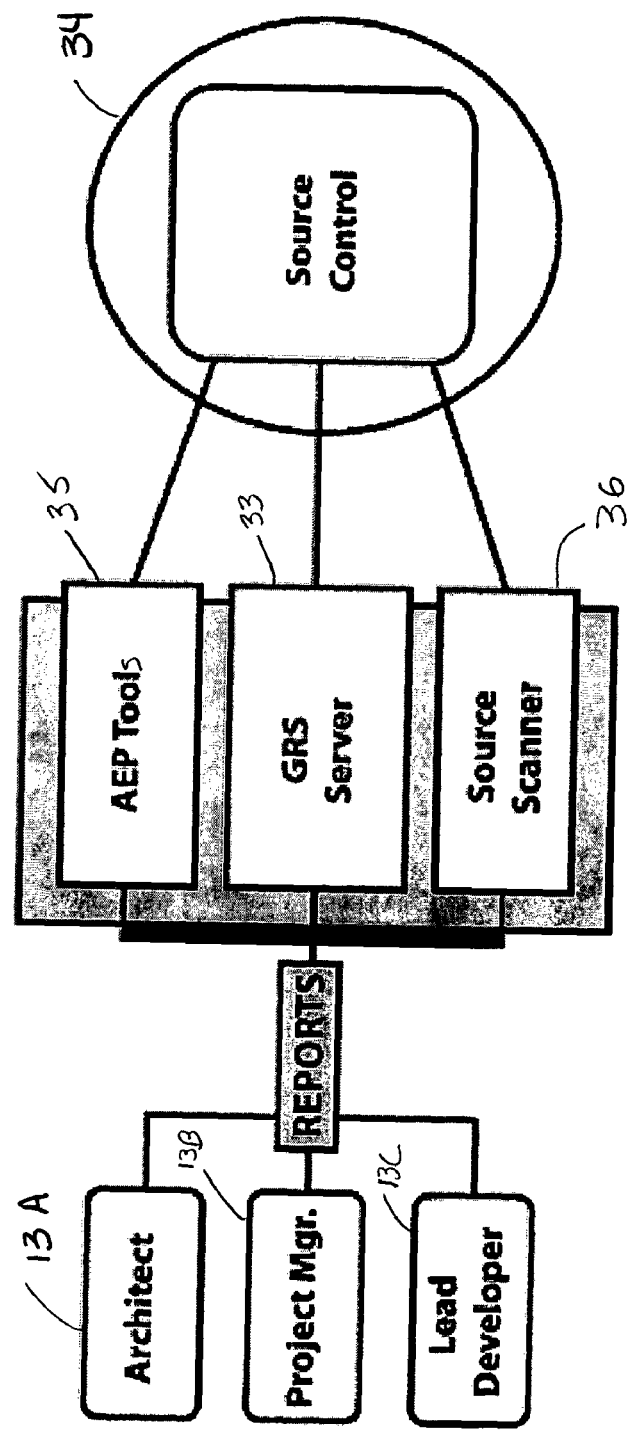
FIG. 3B is an exemplary block diagram of an AEP system including an enterprise reporting server, according to one embodiment of the present invention.

In the second level of reporting, GRS allows enterprise reporting, as shown in FIG. 3B. In this case, GRS includes an enterprise reporting server 33 that is made up of a relational database tied to report processing and publishing engines. Because the server is based on a relational database, it allows capturing large amounts of data about the code base and about team activity, and view it in a variety of ways. Typically, the server is integrated with the source control system 34. This allows data from source control (attributes such as the specific developer who checked in code that caused a violation) to be combined with data from all other software tools 35 to create a comprehensive view of the system. Source scanner 36 scans, for example, the file headers stored in the source control 34, and determines who checked in the file, when the file was checked in, and other similar information. Source scanner 36 then feeds this information to the AEP tools 35 for nightly builds and other tools' usages. The nightly builds run without any human intervention because, as mentioned above, the AEP tools are capable of generating their own test cases, without any prior knowledge of the code. In other words, the AEP tools apply a rule-base system to the code without any human intervention for generating test cases.

The results of the nightly build run is then stored in the GRS server 33. The results are then processed to generate an objective indication of the code quality. In one embodiment, this objective indication of the code quality is a confidence factor, as described below in more detail. The objective indication of the code quality is a quality rating of the entire code that takes into account the verification results of each of the verification tools, the number of test cases run, and the success or failure of the test cases, with respective to each developer and the entire development team.

Even when developers use static analysis at the desktop level to make sure their code is free from errors, they still may find errors during the automatic build that they did not find during the desktop runs. If, for example, a developer checks in a piece of code that affects a code he didn't check, regressions happening from all of the different pieces of code can be tracked with the enterprise reporting server. The developer might see violations that were not generated based on the class the developer checked in, because that class was included in another class, and a correlation exists between them. This is one of the biggest challenges in preventing errors The present invention assists the user to understand the global connection of this piece to the rest of the code base.

The enterprise reporting server is pre-configured to receive data from many different software tools. The server also automatically receives data from all automatic builds. The server is an open platform that can be configured to collect data from a variety of other systems, such as bug tracking systems, allowing the users to see who's working on code and how many bugs are being reported, as well as view the correlation between bugs and the current development practices. The server can also be connected to existing test suites (such as JUnit) or those from other testing products that output a text file. As the number of sources for relevant data included in the system are increased, the users' ability to correlate information about the development process, code, and quality will increase. This information can be used to create reports that correlate the number of lines of code to the amount of bugs, the improvement within specific development teams, or even the progress of individual developers. Most importantly, once the enterprise reporting server is in place, the users have an open platform that can be configured to accept data from any variety of tools to help them better manage their entire software lifecycle.

In one embodiment of the present invention, GRS is pre-configured with sets of reports for the various roles (for example, reports for the developers, architect, and/or project manager), as shown in FIGS. 4A to 4C. At the same time, GRS is not exclusively tied to the AEP system, but it is an open system that can connect to other systems and can accept output from other tools. This means that when used apart from the AEP system of the present invention, the general reporting engine can generate customized reports. The reports generated by GRS can correlate information from different phases of the software development lifecycle and support error prevention for the entire lifecycle. For example, information from monitoring can be correlated to particular pieces of developed code in an effort to pinpoint problems and prevent certain errors from occurring.

In one embodiment, a variety of standard reports are included with the enterprise reporting server, accessible using a standard web browser. Based on a login, users are presented with a Dashboard (GUI) that shows them relevant information based on their role within the system. Developers are able to view different types of graphs which that show how well they performed on achieving coverage of the rules, which rules where used during statistical analysis, which passed and failed, and where they failed, as shown in FIG. 4A. They can also view which pieces of code are failing the most.

Depicted in FIG. 4B, the architect Dashboard includes more detailed reports than the developer's Dashboard. Because part of the architect's job is to discover if the developers are writing bad code, she needs information about the amount of coding violations and correlation between code and bugs. The architect can view the amount of code coverage or other problems, and use this to review problems with the developers and agree on how to improve. When the architect sees from the reports that a certain developer has bad habits or continually violates coding standards, the architect can add extra rules for that individual developer to follow to improve the quality of the code he creates. This is important because it allows the architect to ensure that all members of the development group perform at the same level. The architect can implement rules to address problems that team members have in implementing specific types of objects, or can create others to support potential issues when a project is moved to a new platform or architecture.

Alternatively, the system can automatically put that developer under tighter scrutiny. The system can automatically increase the threshold for the number of errors that developer is allowed to make by changing the configuration file and/or check-in requirements for that specific developer. In this case, the configuration file includes a portion that is common for all the developers and another portion that is specific to a developer. Also, a portion of the configuration file may be common for all the tools, and a portion specific to each tool, so that the problems or unacceptable number of defects by a developer or a tool can be individually addressed by the architect.

The architect guides the group, like a conductor leading everyone to perform in a specific way. The enterprise reporting server serves as a management tool to support this dynamic, tracking, analyzing, and reporting information that can be used to make informed decisions. Architects have insight into weaknesses that may exist within the group or the code, and are able to make the necessary changes to improve the process and outcome.

FIG. 4C shows exemplary screens for a project manager's Dashboard. The project manager receives high-level data about the process and team, including an analysis called the "confidence factor." Confidence factor is based on a number of different pieces of information, combined to produce a numeric value between 1 and 100. This value is not literal, meaning it should not be viewed as a percentage confidence in software reliability. Instead, it is a gauge without set scale. The value of the number is meaningful in the context of each specific project, and changes depending on the information considered and received.

GRS can also correlate information from previous projects to provide confidence factors that help estimate the progress of the current project. Confidence factors use a scale from 0% to 100%, helping to determine how successful the tests have been in analyzing a project, and indicate what types of tests may still need to be conducted. The higher the confidence factor number, the better the software application is working and the more likely it is to succeed after deployment. Ideally, an increase in all statistics related to confidence factor is desirable, as the project matures. These statistics are particularly valuable when integrating and testing various modules into a final product. Confidence factors show, at a glance, if any one module that is added to a project is complete enough to stay in the final build or if it needs further work.

In summary, GRS provides overview of entire software development lifecycle, provides decision support engine for project management, allows estimation of project timelines based upon empirical data, allows evaluation of project quality based upon empirical data, and correlates information from previous projects to estimate progress of current project (confidence factors).

The confidence factor is a number that is correlated to the chance of the software system working correctly for any task. The confidence factor is a precise objective quantity. Every system has a unique confidence factor-whether or not that level is known. Because the confidence factor is a objective property, one can measure it using typical experimental tasks. The most efficient way to do this is to set up an automatic system.

One can assess a system's confidence factor as follows:
Carefully define the different tasks that the system needs to perform.
Apply these tasks to the system.
Determine how many of these tasks the system executes correctly.
Calculate the confidence factor (C) by plugging results into equation 1 (below), where p represents the number of passing test cases and t represents the total number of test cases.

$$C=p/t\times 100 \qquad (1)$$

The process for determining the confidence factor resembles the quality assurance (QA) process in that, both involve determining system tasks, creating test cases that represent those tasks, executing the test cases, and checking the results. Consequently, an infrastructure that produces a confidence factor can be built upon an existing QA framework without extravagant effort or cost. QA departments have been performing most of these steps for years, but information technology (IT) departments have not really tried to use QA's test suites to help management make informed deployment decisions.

If a software system has a 95% confidence factor, this means that it should be able to execute the required tasks flawlessly about 95% of the time. Here, the key to improving the confidence factor is to determine whether the hardware or software causes the problem, then improve the reliability of the appropriate component. With any product, a realistic and reasonably high confidence factor is necessary before the confidence factor can truly enable dynamic decision making. The confidence factor should be realistic, meaning, the measured confidence factor should be close to the system's actual chances of correctly executing the required tasks correctly in the field. However, even if a system's confidence factor is measured accurately, it won't help the executives make dynamic decisions unless the level is reasonably high.

In order to accurately determine a system's confidence factor, the following two questions should be answered:
1. Are there enough test cases to accurately measure the confidence factor?
2. Are the test cases covering enough of the system to accurately measure the confidence factor?

In other words, both the quantity and quality of test cases are critical to achieving an accurate estimation of the system's confidence factor. One could always try to assess a system's confidence factor by determining the system's critical tasks, creating test cases that represent those tasks, running the test cases, then plugging the results into a simple equation. However, obtaining an accurate measurement of a system's true confidence factor is more complex.

To accurately measure a system confidence factor one needs to:

Ensure that sufficient test cases have been added throughout the system,

Gauge the quality of these test cases,

Determine how past confidence factor measurements predict current system stability, and Calculate a confidence factor based on the above three factors.

First, let's explore how to determine whether there is a sufficient number of test cases, and how to create that number of test cases as economically as possible. As the test suite first begins to grow, the confidence factor will jump up and down fairly dramatically. Theoretically, as the number of test cases approaches infinity, the measured confidence factor will asymptotically reach the system's actual confidence factor (or at least, approach it with a low margin of experimental error).

To determine the confidence factor of a software system, test cases are used as data points. After these data points are created, mean and standard deviation are used to approach the target level. The more data points are used, the closer the measured confidence factor approaches the real confidence factor. By using statistical modeling with means and standard deviations, the proximity to the real confidence factor can be pinpointed.

The initial build-up of the code base occurs when the system is originally developed and all the main features are implemented. The more the specifications change, the more frequently the test cases, need to be run, and the greater the return on investment from building the test cases.

Now, let's look at how to determine that the accumulative test cases are good enough meaning they cover most system features. In principle, it's close to impossible to have enough test cases to cover all of the possible features. There are several different options to determine how well the system is being covered.

One option is to measure the "code coverage," or "system coverage." Although the focus of this discussion is on code coverage here, the same principles can be applied to database table and field coverage, Web site page/link coverage, and so on. One possible way to get a more accurate estimate of the confidence factor is to multiply the confidence factor by the coverage percentage.

The code's complexity level is another variable related to test case quality. Computer scientists have developed matrixes that define code complexity by looking at the code's number of branches, number of loops, size of functions, and so on (for the Web complexity accounts for number of form options, the amount of links, and so on). It has been determined that complex code yields less reliable code. The more complex the code is, the greater coverage the test suite needs to achieve in order to produce a realistic confidence factor. In other words, for a high code complexity but low test suite coverage, the test suite quality is lacking and the confidence factor that it measures will probably have a large degree of experimental error. An estimation of the code's complexity also helps calculate the number of bugs that might still be lurking in the code, that is another factor that affects the measured confidence factor's degree of experimental error.

Feature coverage is a popular way to gauge test suite quality. Verifying feature coverage involves creating an input/outcome relationship for each entry in the specification, then feeding the system the inputs and checking whether the correct outcomes were produced. Results of gauging various types of coverage (line coverage, branch coverage, Web site coverage, menu coverage, database coverage, and so on) and estimating code complexity can be factored into the confidence factor measurements.

The degree of variation in the confidence factor as the code is modified indicates code stability. If the confidence factor is measured as the ratio of passing test cases to total test cases, the number rises and falls as the code is modified. If the confidence factor changes a lot, it indicates that the system is not very stable. If the confidence factor changes very little, the system is probably stable.

As an example, implementation of coding standards in the AEP process is now described. Coding standards (a.k.a., coding rules, or simply, rules) are language specific programming rules that greatly reduce the probability of introducing errors into software applications, regardless of which software development model (iterative, waterfall, extreme programming, etc.) is being used to create that application. Coding standards are an important error prevention tool, but they need to be used regularly, in order to be effective. This is especially true as development projects become more and more complex in an effort to meet consumer demand for better features and more functionality.

As described above, implementing coding standards (or any other tools) in the AEP process can be done in two ways (or a combination of the two ways thereof). First, the coding standards can be integrated into the software development process in one phase. Alternatively, coding standards can be introduced into the AEP process in a multi-phased "divide and conquer" approach.

An important feature in checking-in the source code into a repository upon completion of daily tasks is a static analysis filter, which serves as gatekeeper to the source code repository by analyzing and rejecting any code that has not passed a strict automated code review. For example, Parasoft's CodeWizard™ can be used as such a filter. This filter acts as a first line of defense against errors by immediately rejecting code that does not conform to the accepted coding practices of either the development group or of the company as a whole. CodeWizard™ uses Source Code Analysis Technology to parse code (e.g., C and C++ code) looking for specific coding patterns that compilers do not detect. Each such coding pattern corresponds to a CodeWizard™ rule which in turn expresses a particular coding guideline. Code that has been deemed "clean" by the filter is much less problematic when it comes to more advanced testing procedures, such as unit testing, functional testing, and load testing. When all coding errors have been corrected, only more complex errors, such as memory corruption, memory leaks, and so on, remain.

Unit testing involves testing software code at its smallest functional point, which is typically a single class. Each individual class should be tested in isolation before it is tested with other units or as part of a module or application. By testing every unit individually, most of the errors that might be introduced into the code over the course of a project can be detected or prevented entirely. The objective of unit testing is to test not only the functionality of the code, but also to ensure that the code is structurally sound and robust, and is able to respond appropriately in all conditions. Performing unit testing reduces the amount of work needs to be done at the application level, and drastically reduces the potential for errors. However, unit testing can be quite labor intensive if performed manually. The key to conducting effective unit testing is automatically generating test cases.

Load testing is the process of exercising a Web-based or client/server application with multiple users and verifying whether the application functions correctly under tested traffic levels, patterns, and combinations. An application might function flawlessly when running with a few careful testers who exercise it in the intended manner. However, when a large number of users with incompatible systems, inevitable network delays, and applications that run for months without restarting, are introduced in practice, the system is likely to slow down, encounter functionality problems, or crash altogether. Load testing helps understand how the system will fare in real-life situations so that the developers can anticipate and even prevent load-related problems.

Load testing typically involves exercising the application with virtual users and measuring performance statistics to verify whether the application supports the anticipated traffic load as well as possible traffic surges, growth, and so on. To ensure that the virtual users' experiences effectively predict the actual users' experiences, want the virtual users need to simulate realistic types and combinations of click paths, realistic delays between clicks, and so forth. Ideally, load testing does not simply look at the response time and rates delivered for various load scenarios; it also involves running tests so that the developers can determine what problems, in addition to slow load times and rates, might occur in different situations. For example, load testing should identify load scenarios that can cause problems such as, transactions that do not execute correctly, bottlenecks and delays that frustrate users and reduce user productivity, transactions that do not satisfy service level agreements, and interface pages that do not load correctly or do not load at all.

However, not all performance problems are caused by the application. The best way to identify bottlenecks caused by the network and the system is to perform stress testing from different locations inside and outside the network. To do this, each link to the system is tested individually starting with the internal network link that goes directly to the Web server and moving progressively farther from the Web server until remote locations far outside the network. Testing each link involves pushing it to its full load capacity and then verifying whether everything still functions correctly. After all the individual links are tested at their highest capacity, the full system capacity is tested by simultaneously testing all links to the system at their highest capacity.

Source code repositories and gatekeepers together control automated nightly application builds for code standards. As such, they are not simply control code reservoirs but the first line of application testing. The minimal nightly build should extract all necessary code from the source code repository, compile that code, and build the application. An ideal nightly build should run all available coding standards and report any rule violations that occur. Such precautions ensure that all developers are following prescribed practices during the day and that any discrepancies are flagged before they corrupt further code additions.

Once the source code repository and static analysis filter are in place, it is time to populate the filter with coding standards. Coding standards are language-specific programming rules that reduce the probability of introducing errors into the applications, regardless of which software development model (iterative, waterfall, extreme programming, and so on) is being used to create that application. Based on the correlations between bugs and coding practices, a set of rules are developed for preventing coding errors from occurring.

Coding standards offer substantial value to software development organizations because they are pre-packaged automated error prevention practices; they close the feedback loop between a bug and what must be done to prevent that bug from reoccurring. The developers don't have to write their own rules to get the benefit of coding standards. In a team environment or group collaboration, coding standards ensure uniform coding practices, reducing oversight errors and the time spent in code reviews. Coding standards enforcement is static analysis of source code for certain rules and patterns to detect problems automatically based on the knowledge collected over many years by industry experts.

These standards should be introduced in a phased, incremental approach in order to not disrupt the development cycle. Preferably, a cut-off date for the code that will be subjected to the testing requirement is chosen. Other points to consider when selecting appropriate coding rules are:
1. Functionality,
2. Ownership,
3. Severity levels, and
4. Phase-in priority.

The following sections describe the process of breaking coding standards implementation into manageable units by completing each of these phases. The overall focus is determining coding standards needs and what rules best fit a particular development style from an organizational standpoint and also for individual development teams. A priority level for these rules with regard to the implementation timeline needs to be determined as well. When implementing the "divide and conquer" approach, it is assumed that an organization's development team manager or architect has already the answers to the following focused questions concerning an organization's commitment to error prevention and the role coding standards are to play in that commitment.
1. How does the organization currently prevent coding errors from occurring (or reoccurring)?
2. What is the best way for the entire organization to implement coding standards?
3. Does the organization have a set of established coding standards?
   If so, are they customizable?
   Can these coding standards be referenced in a specification document?
   Is the document fully institutionalized? That is, does management understand its importance and expect development to follow it?
4. Do developers participate in customizing coding standards so that they reflect actual standards and practices?

It is best to be as introspective as possible when introducing coding standards into a development team or organization. If the organization already has a basic set of rules that developers follow when coding, then the next step is to arrange those standards according to functionality. Classifying the coding standards by functionality allows the flexibility of identifying what areas within certain projects may need additional rule support. The metrics developed by this classification can be used to make determinations for resource allocation on a per-project basis.

The following table offers an example of an initial functional classification document. Keep in mind that this table does not constitute a complete representation of every functional category with the C and C++ coding languages.

TABLE 1

| Category | Rule |
|---|---|
| Shifting from C to C++ | Prefer iostream.h stdio.h |
| | Use new and delete instead of malloc and free |
| Memory Management | Use the same form in corresponding calls to new and delete |
| | Call delete on pointer members in destructors |
| | Check the return value of new |
| | Adhere to convention when writing new |
| | Avoid hiding the global new |
| | Write delete if you write new |
| Classes and Functions: Design and Declaration | Differentiate among member functions, global functions, and friend functions |
| | Avoid data members in the public interface |
| | Pass and return objects by reference instead of by value |
| Constructors, Destructors, and Assignment Operators | Define a copy of constructor and assignment operator for classes with dynamically allocated memory |

TABLE 1-continued

| Category | Rule |
|---|---|
| | Prefer initialization to assignment in constructors |
| | List members in an initialization list in the order in which they are declared |
| | Make destructors virtual in base classes |
| | Have operator = return a reference to this* |
| | Assign to all data members in operator= |
| | Check for an assignment to self in operator= |

This table is a simplified list of rules frequently used by a given development team. The fact that there are only two rules included in the "Shifting from C to C++" category is not a problem, if such a shift has not been undertaken, or if it is not in the immediate future for that team. However, should a wholesale shift from C to C++ become necessary, then having rules mapped by category will enable this team to see at a glance that additional rules will be needed in order to make this transition as smooth as possible.

A functionality review should be performed frequently, approximately every six months, so that the rules specification document does not become obsolete. For example, should the organization choose to transition to 64-bit architectures, then an entirely new category of rules would be needed, which could be called "32-bit to 64-bit Porting Rules." This category could include such rules as those listed in the following table, among others of this type:

TABLE 2

| Rule | Description |
|---|---|
| 3264bit_32BitMultiplication | Do not assign the value 32-bit multiplication to type long |
| 3264bit_castPointerToUINT | Do not cast pointer to UINT type |
| 3264bit_IntPointerCast | Do not cast pointer to int type |
| 3264bit_IntToLongPointerCast | Incompatible cast |
| 3264bit_LongDouble | Possible truncation |
| 3264bit_LongToDoubtCast | Possible truncation |
| 3264bit_Union | Avoid union if it is possible |
| 3264bit_UsingLong | Avoid using long |

Once your rules are classified by functionality, then you should divide them into the three ownership groups listed in the following table:

TABLE 3

| Group | Description |
|---|---|
| Organization | These coding standards represent those rules that everyone must follow, regardless of project or development group. These rules are language-specific standard; any violation of these standards results in unpredictable application behavior. Examples of organization rules include "Define a copy constructor in assignment operator for classes with dynamically allocated memory" or "Assign to all data members in operator=". |
| Project | These coding standards represent those rules that a particular project or development team must follow, in addition to the organizational rules. If used frequently enough project rules could become organizational rules, but generally these rules are deviations to the organizational rules that a project team must follow in order to adhere to customer application requirements. Examples of project rules include "Have operator = return a reference to *this" or "Do not use i64 or L suffixes directly." |
| Individual | These coding standards represent those rules that individual programmers define for personal use. The types of coding standards that fall into this classification depend upon the individual developers skill level, as these rules are usually built to serve as corrective anecdotes for frequently made coding errors. Examples of individual rules include basics such as "Do not cast pointers to non-pointers" or "Provide only one return statement in a function." |

By placing the coding standards into these categories, the users have a much-needed view of how and where their coding standards are being utilized throughout their organization. The ownership demarcations provide, at a glance, confirmation of where the coding standards are being employed. After the coding standards have been divided by ownership categories, the severity level of each standard is determined. This allows the users to prioritize their coding standards and deploy them in order of importance. The exemplary five severity level categories are based upon the likelihood of bugs being introduced into the application, if a particular rule is violated or skipped.

The following table represents the severity level rankings deployed by, for example, Parasoft's CodeWizard™. The order of severity importance is numerical, that is, a Severe Violation (#1) always results in an error. Each category thereafter represents rules violations that have a progressively lower probability of resulting in an error, down to the Informational category of rules (#5):

TABLE 4

| Rank | Name | Description |
|---|---|---|
| 1 | Severe Violation | This category of errors represents a severe violation of a rule or rules. This category has the greatest chance of resulting in a bug. |
| 2 | Violation | This category represents a violation of a rule or rules and may result in an error or unpredictable behavior. |
| 3 | Possible Severe Violation | This category represents possible severe violations of a rule or rules and will most likely result in an error or unpredictable behavior. |
| 4 | Possible Violation | This category represents a possible violation of a rule or rules and could result in an error or unpredictable behavior. |
| 5 | Informational | For information purposes only. This category of errors has the least chance of resulting in a bug. |

When introducing coding standards into the development process the user should implement rules incrementally based upon this order of severity. Those rules that have the greatest probability of preventing an error and are of most importance are implemented first. Then, those rules that have a lower probability of preventing an error and are less critical are implemented. Rules can be implemented based on single categories (one category at a time, from 1 to 5) or based on a group for a faster implementation (categories 1-2 first, then 3-4, and finally 5, or 1-2, then 3-5). As the development team or organization becomes comfortable with the first set of standards and avoids violating those rules, then they can enforce the next category of rules. No matter what stage of enforcement developers are in, all appropriate coding standards should be passed satisfactorily before code is checked into the source code repository. This prevents error-prone code from spawning errors and becoming increasingly error-prone and difficult to manage/develop, and it forces developers to face and fix problems before they continue to introduce the same problem into new code.

Introducing coding standards in multiple stages creates an environment that is conducive to good coding practices, allowing development teams to begin using important or critical rules first, then less important rules, and so on. This approach also allows development teams to ramp up their coding standard initiatives in a gradual manner without creating unreasonable workload expectations. In one embodiment, coding standards phase-in priorities are defined as shown in the following table:

TABLE 5

| Level | Description | Phase-In |
| --- | --- | --- |
| Must have Rules | These are high priority rules that must be implemented first in order to successfully complete a project or application. Examples include standard C and C++ language constructs ("Do not call delete on non-pointers") and rules that result in severe or unpredictable functional behavior when violated. | 30 Days |
| Should Have Rules | These are medium priority rules that can be implemented after the severe "must have" rules have been chosen and automated. These are standard rules that result in erratic code behavior when violated. | 60 Days |
| Nice To Have Rules | These are the low priority rules that can be implemented after the first two categories have been successfully automated. These represent rules that may not result in erratic functionality or code behavior when violated but nevertheless, result in poor coding constructs and reduced code maintainability. | 90 Days |

The gradual, phased approach of the 30-60-90 rule makes coding standards enforcement much more manageable. Once the application has become stable through the enforcement of the "Must Have" rules, the user can concentrate on perfecting the code with the remaining categories.

Once coding standards are implemented, and the automated infrastructure is set up to enforce them, a short trial period can be used to determine the impact of those standards. For example, after six months, the amount by which errors have been reduced can be measured, and reported. If, at the end of this period, further rules need to be added or current rules amended, then the "divide and conquer" approach, described above, can be restarted to fully evaluate where the process can be improved.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for automatically preventing errors in computer software having a plurality of different life cycle phases, the method comprising:

storing source code of the computer software in a code repository;

providing a plurality of software verification programs to verify the computer software, wherein each of the plurality of software verification programs relates to a respective lifecycle phase of the computer software, and automatically generates one or more test cases from the source code of the computer software, and wherein each of the plurality of software verification programs is an independent verification tool including a user interface and is capable of being executed in a batch process;

executing a first software verification program relating to a first lifecycle phase of the computer software, wherein the first software verification program automatically generates one or more test cases from the source code of the computer software;

executing a second software verification program relating to a next lifecycle phase of the computer software different from the first lifecycle phase, wherein the second software verification program automatically generates one or more test cases from the source code of the computer software;

generating verification results for the first and the next lifecycle phase of the computer software, responsive to executing the first and second software verification programs and the automatically generated test cases;

processing the verification results for generating a representation of functional behavior of the computer software; and providing a common configuration file for the plurality of verification programs;

customizing a verification scope of one or more of the verification programs by modifying the common configuration file responsive to an objective criterion of quality of the computer software wherein the objective criterion of quality is a quality rating of the entire computer software that takes into account the verification results of each of the verification programs, the number of test cases executed, and the success or failure of the test cases.

2. The method of claim 1 further comprising modifying a portion of the common configuration file specific to one of the plurality of verification programs responsive to the objective criterion of quality of the computer software.

3. The method of claim 1 further comprising modifying a portion of the common configuration file specific to one of a plurality of software developers responsive to the objective criterion of quality of the computer software.

4. The method of claim 1, further comprising formulating the verification results in a confidence factor represented by the equation:

$$C = p/t \times 100,$$

where p is number of successful test cases and t is total number of test cases.

5. The method of claim 1, wherein each portion of the computer software being developed by a software developer of a plurality of software developers, and the verification results include a plurality of objective criteria each of the plurality of objective criteria corresponding to quality of a respective portion of the computer software developed by each software developer of the plurality of software developers.

6. The method of claim 5 further comprising providing a common configuration file for the plurality of verification programs; and modifying the common configuration file responsive to one or more objective criteria corresponding to quality of a respective portion of the computer software developed by each software developer.

7. The method of claim 5 further comprising verifying a first portion of the computer software developed by a first developer of the plurality of software developers using the plurality of verification programs, before the computer software is stored in the code repository.

8. The method of claim 7 further comprising allowing storing the first portion of the computer software in the code repository only if result of verification of the first portion meets a set standard.

9. The method of claim 8 further comprising modifying the set standard responsive to the objective criterion of quality of the computer software.

10. The method of claim 8, wherein the set standard is common to each of the plurality of software developers.

11. The method of claim 8, wherein the set standard is unique to at least one of the plurality of software developers.

12. A system for automatically preventing errors in computer software having a plurality of different life cycle phases comprising:

a processor for executing computer software;

a code repository for storing source code of the computer software;

means for providing a plurality of software verification programs to verify the computer software, wherein each of the plurality of software verification programs relates to a respective lifecycle phase of the computer software and automatically generates one or more test cases from the source code of the computer software, and wherein each of the plurality of software verification programs is an independent verification tool including a user interface and is capable of being executed in a batch process;

means for executing a first software verification program relating to a first lifecycle phase of the computer software, wherein the first software verification program automatically generates one or more test cases from the source code of the computer software;

means for executing a second software verification program relating to a next lifecycle phase of the computer software different from the first lifecycle phase, wherein the second software verification program automatically generates one or more test cases from the source code of the computer software;

means for generating verification results for the first and the next lifecycle phases of the computer software, responsive to executing the first and second software verification programs and the automatically generated test cases;

means for processing the verification results for generating a representation of functional behavior of the computer software; and means for providing a common configuration file for the plurality of verification programs;

means for customizing- a verification scope of one or more of the verification programs by modifying the common configuration file responsive to an objective criterion of quality of the computer software wherein the objective criterion of quality is a quality rating of the entire computer software that takes into account the verification results of each of the verification programs. the number of test cases executed, and the success or failure of the test cases.

13. The system of claim 12 further comprising means for modifying a portion of the common configuration file specific to one of the plurality of verification programs responsive to an objective criterion of quality of the computer soft-ware.

14. The system of claim 12 further comprising means for modifying a portion of the common configuration file specific to one of a plurality of software developers responsive to an objective criterion of quality of the computer software.

15. The system of claim 12, further comprising means for formulating the verification results in a confidence factor represented by the equation:

$$C = p/t \times 100,$$

where p is number of successful test cases and t is total number of test cases.

16. The system of claim 12, wherein each portion of the computer software being developed by a software developer of a plurality of software developers, and the verification results include a plurality of objective criteria each of the plurality of objective criteria corresponding to quality of a respective portion of the computer software developed by each software developer of the plurality of software developers.

17. The system of claim 16 further comprising means for providing a common configuration file for the plurality of verification programs; and means for modifying the common configuration file responsive to one or more objective criteria corresponding to quality of a respective portion of the computer software developed by each software developer.

18. The system of claim 16 further comprising means for verifying a first portion of the computer software developed by a first developer of the plurality of software developers using the plurality of verification programs, before the computer software is stored in the code repository.

19. The system of claim 18 further comprising means for allowing storing the first portion of the computer software in the code repository only if result of verification of the first portion meets a set standard.

20. The system of claim 19 further comprising means for modifying the set standard responsive to the objective criterion of quality of the computer software.

21. The system of claim 19, wherein the set standard is common to each of the plurality of software developers.

22. The system of claim 19, wherein the set standard is unique to at least one of the plurality of software developers.

23. A method for automatically preventing errors in computer software having a plurality of different life cycle phases, the method comprising:

detecting an error in the computer software, the detected error belonging to a class of errors;

providing a plurality of software verification programs each of the plurality of software verification programs related to a respective lifecycle phase of the computer software, wherein each of the plurality of software verification programs is an independent verification tool including a user interface and is capable of being executed in a batch process;

analyzing the detected error in the computer software;

determining what phase of the lifecycle the detected error was introduced, based on analyzing the detected error;

providing a common configuration file for the plurality of verification programs;

customizing a verification scope of one or more of the plurality of verification programs that correspond to the determined lifecycle phase where the detected error was introduced;

executing the plurality of software verification programs to verify the class of the detected error is detected in a same lifecycle phase of the computer software as the determined lifecycle phase where the detected error was introduced, wherein the plurality of software verification programs automatically generate one or more test cases from a source code of the computer software;

generating verification results for the each lifecycle phase of the computer software, responsive to executing the plurality of software verification programs and the automatically generated test cases; and customizing a verification scope of one or more of the verification programs by modifying the common configuration file responsive to an objective criterion of quality of the computer software wherein the objective criterion of quality is a quality rating of the entire computer software that takes into account the verification results of each of the verification programs, the number of test cases executed, and the success or failure of the test cases.

24. The method of claim 23 further comprising modifying a portion of the configuration file specific to one of the plurality of verification programs based on the objective criterion of quality of the computer software.

25. The method of claim 23 further comprising modifying a portion of the common configuration file specific to one of a plurality of software developers responsive to the objective criterion of quality of the computer software.

26. The method of claim 23, further comprising processing the verification results for generating an objective criterion of quality of the computer software by formulating the verification results in a confidence factor represented by the equation:

$$C = p/t \times 100,$$

where p is number of successful test cases and t is total number of test cases.

27. The method of claim 23 further comprising customizing the verification scope of one or more of the plurality of verification programs for a second time, if the known error is not detected by executing the plurality of software verification programs.

28. The method of claim 23 further comprising executing the plurality of software verification programs periodically to prevent the known error from re-occurring when the computer software is modified.

29. A system for automatically preventing errors in computer software having a plurality of different life cycle phases comprising:

a processor for executing computer software;

means for detecting an error in the computer software, the detected error belonging to a class of errors;

means for providing a plurality of software verification programs each of the plurality of software verification programs related to a respective lifecycle phase of the computer software, wherein each of the plurality of software verification programs is an independent verification tool including a user interface and is capable of being executed in a batch process;

means for analyzing the detected error in the computer software;

means for determining what phase of the lifecycle the detected error was introduced, based on analyzing the detected error;

means for providing a common configuration file for the plurality of verification programs;

means for customizing a verification scope of one or more of the plurality of verification programs that correspond to the determined lifecycle phase wherein the detected error was introduced;

means for executing the plurality of software verification programs to verify the class of the detected error is detected in a same lifecycle phase of the computer software as the determined lifecycle phase wherein the detected error was introduced, wherein the plurality of software verification programs automatically generate one or more test cases from a source code of the computer software;

means for generating verification results for the each lifecycle phase of the computer software, responsive to executing the plurality of software verification programs and the automatically generated test cases; and means for customizing a verification scope of one or more of the verification programs by modifying the common configuration file responsive to an objective criterion of quality of the computer software wherein the objective criterion of quality is a quality rating of the entire computer software that takes into account the verification results of each of the verification programs, the number of test cases executed, and the success or failure of the test cases.

30. The system of claim 29 further comprising means for executing the plurality of software verification programs to verify the known error is detected in computer software.

31. The system of claim 30 further comprising means for customizing the verification scope of one or more of the plurality of verification programs for a second time, if the known error is not detected by executing the plurality of software verification programs.

32. The system of claim 29 further comprising means for executing the plurality of software verification programs periodically to prevent the known error from re-occurring when the computer software is modified.

* * * * *